US006113745A

United States Patent [19]

Maitland et al.

[11] Patent Number: 6,113,745

[45] Date of Patent: Sep. 5, 2000

[54] COKE DRUM SYSTEM WITH MOVABLE FLOOR

[75] Inventors: Charles F. Maitland, Sugarland, Tex.; Bruce Kerr, Maumee, Ohio; Samuel A. Martin, Sugarland, Tex.; Michael B. Knowles, Missouri City, Tex.; Leslie P. Antalffy, Houston, Tex.

[73] Assignee: Fluor Corporation, Aliso Viejo, Calif.

[21] Appl. No.: 09/100,198

[22] Filed: Jun. 18, 1998

[51] Int. Cl.[7] .............................. B01D 3/14; C10B 33/00; C10B 25/00

[52] U.S. Cl. ............................ 202/262; 202/214; 202/244

[58] Field of Search ..................................... 202/214, 244, 202/245, 246, 262; 110/268, 274, 116, 118, 101 C; 432/56

[56] References Cited

U.S. PATENT DOCUMENTS

| | | | |
|---|---|---|---|
| 900,206 | 10/1908 | Reed | 202/214 |
| 4,960,358 | 10/1990 | DiGiacomo et al. | 414/684.3 |
| 5,581,864 | 12/1996 | Rabet | 29/426.3 |
| 5,785,843 | 7/1998 | Antalffy et al. | 208/131 |

*Primary Examiner*—Marian C. Knode
*Assistant Examiner*—Alexa Doroshenk
*Attorney, Agent, or Firm*—Robert D. Fish; Fish & Associates, LLP.

[57] ABSTRACT

Methods and compositions are provided which decrease the risk and spillage associated with discharging coke from a coking vessel. The risk to workers is decreased by eliminating the need for workers to be near the coking vessel while the head is being removed. The spillage is decreased by modifying the effective diameter of the coke chute inlet in a manner which allows it to catch any materials discharged from the coking vessel both during and after the opening of the bottom head. The process can enhance drum draining and further eliminate the need for process piping to facilitate the draining of water from the coking vessel.

6 Claims, 5 Drawing Sheets

COKE DRUM SYSTEM WITH MOVABLE FLOOR

FIELD OF THE INVENTION

The present invention relates to the field of hydrocarbon processing.

BACKGROUND OF THE INVENTION

Many refineries recover valuable products from the heavy residual oil that remains after refining operations are completed. This recovery process, known as delayed coking, produces valuable distillates and coke in one or more large vessels known as coke drums or coking vessels. As used herein, coking drums and vessels are used interchangeably. The operating conditions of delayed coking can be quite severe. Normal operating pressure typically range from about 15 to about 60 pounds per square inch, and the feed input temperature may be over 900° F.

Coke drums are typically large, cylindrical vessels having a top head and a frustoconical bottom portion fitted with a bottom head. Coke drums are usually present in pairs so that they can be operated alternately. Thus, while one coke drum is being filled with residual oil and heated, the other drum is being cooled and purged of up to several hundred tons of coke formed during the previous recovery cycle. Purging a drum of coke is often referred to as "coke recovery".

Coke recovery begins with a cooling step in which steam and water are introduced into the coke filled vessel to complete the recovery of volatiles and to cool the mass of coke. The vessel is then vented to atmospheric pressure and the top head (typically a 4-foot diameter flange) is unbolted and removed. The vessel is drained and the bottom head (typically a 7-foot diameter flange) is unbolted and removed. A hydraulic coke cutting apparatus is inserted into the vessel to cut the coke. The hydraulically cut coke falls out of the vessel and into a recovery chute to be channeled to a coke pit or pad. Typically, the recovery chute replaces the removed bottom head so that coke falling through the opening created by removal of the bottom head immediately enters the recovery chute. While ideally all of the coke is captured by the chute and falls through to a coke pit below, in practice there is spillage, and essentially all of the coke is taken to be channeled through to the coke pit as long as no more than a few percent of coke spills onto the floor. However, it is common to have at least some spillage whenever the head is removed, and such spillage is undesirable both because it results in extra work in cleaning up the spillage, and because it poses a threat to workers. Spillage frequently occurs during bottom head removal, and occasionally occurs after head removal but before the coke chute is positioned, especially when shot coke is produced.

Attempts to prevent spillage and to reduce risk to workers have been made, and can generally be categorized as (1) automating the opening or deheading of the coking vessel, and (2) automating the positioning of the coke chute. Automating the deheading of the coking vessel decreases the risk to workers because they need not be present during the initial opening of the vessel when spillage frequently occurs. However, decreasing the risk to workers in this matter does not eliminate the spillage during the opening process.

Moreover, if the positioning of the coke chute is not automated, the workers are at risk while positioning the coke chute. Even with an automated chute positioning system, there is a chance that spillage, itself undesirable, will occur prior to the chute being positioned.

Thus, there is a further need for an improved method and system which will allow coke to be discharged from a coking vessel without placing workers at risk such as by requiring workers to position a coke chute after opening an outlet in the coking vessel, and which will prevent spillage while opening an outlet in the coking vessel. Other and further objects and advantages will appear hereinafter.

SUMMARY OF THE INVENTION

Methods and apparatus are provided which decrease the risk and spillage associated with discharging coke from a coking vessel. The risk to workers is decreased by eliminating the need for workers to be near the coking vessel while the head is being removed. The spillage is decreased by modifying the effective diameter of the coke chute inlet in a manner which allows it to catch any materials discharged from the coking vessel both during and after the opening of the bottom head. The invention also provides a means to safely drain a coke drum by opening the bottom head with a deheading system or other means. This can eliminate the need for drum drain connection on the vessel or drum piping.

Various objects, features, aspects and advantages of the present invention will become more apparent from the following detailed description of preferred embodiments of the invention, along with the accompanying drawings in which like numerals represent like components.

DETAILED DESCRIPTION

Figure 1A:
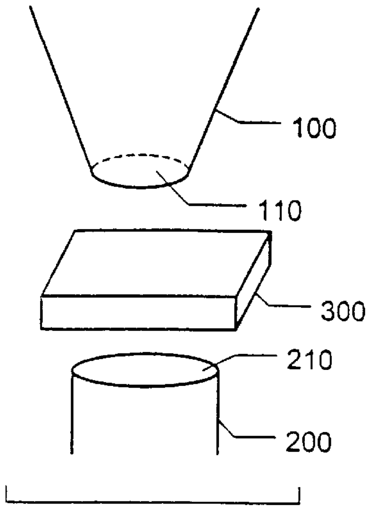
FIG. 1*a* is a schematic view of a first system embodying the invention.
Figure 1B:
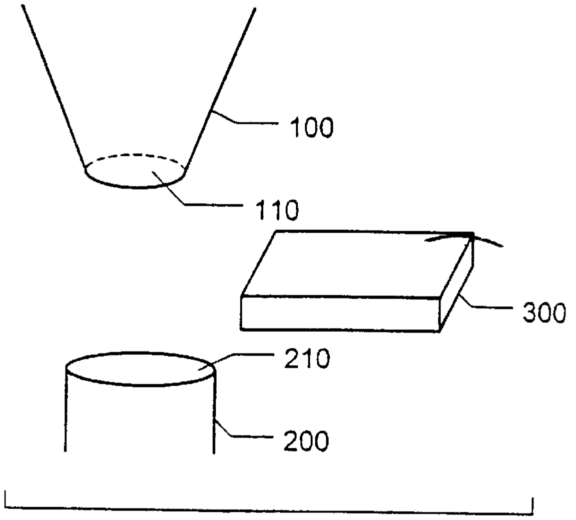
FIG. 1*b* is a schematic view of the system of FIG. 1*a;*

In FIG. 1*a*, a delayed coking system has a coking vessel 100, a vessel outlet 110, a coke chute 200 having a chute inlet 210, and a worker support platform 300. In FIG. 1*a*, the support platform 300 is positioned in a manner which prevents drainage from the vessel outlet 110 to the chute inlet 210. In FIG. 1*b*, the support platform 300 is positioned in a manner which allows drainage from the vessel outlet 110 to the chute inlet 210. When positioned as shown in FIG. 1*b*, coke discharged through vessel outlet 110 can fall without spilling onto the support platform.

Figure 2A:
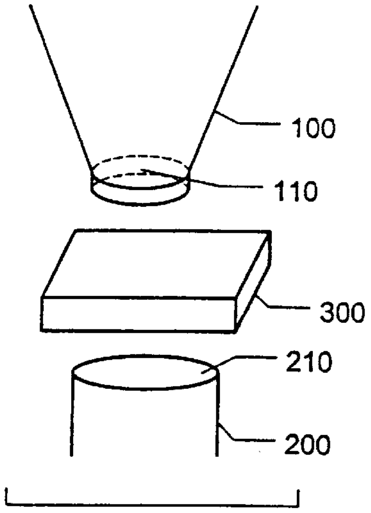
FIG. 2*a* is a schematic view of a second system embodying the invention.
Figure 2B:
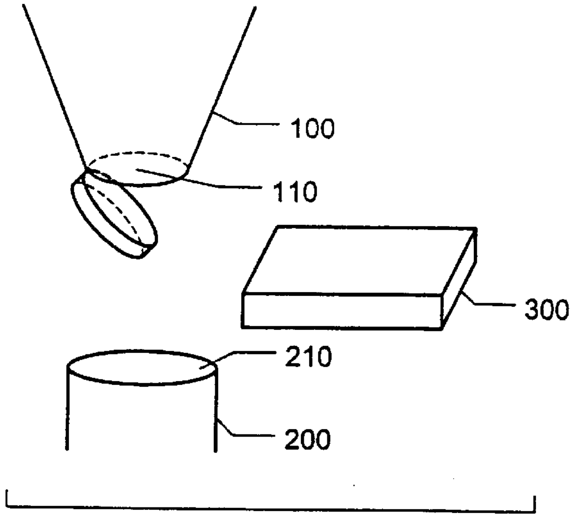
FIG. 2*b* is an alternate view of the system of FIG. 2*a;*
Figure 2C:
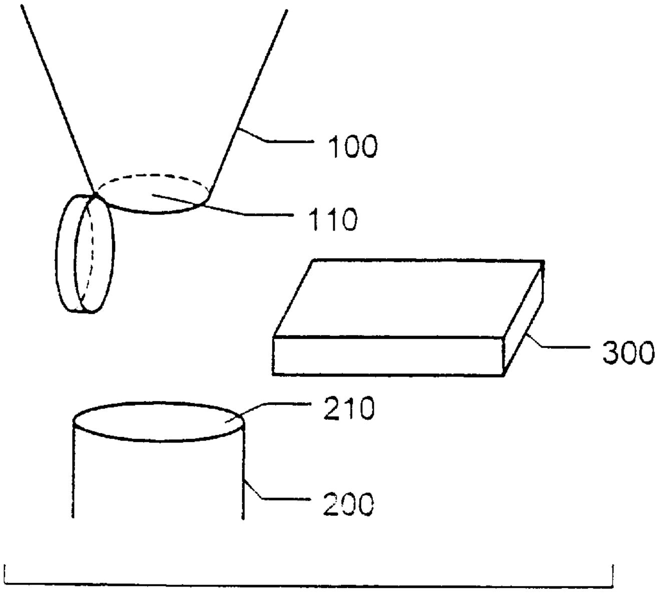
FIG. 2*c* is an alternate view of the system of FIG. 2*a;*

FIGS. 2*a*, 2*b*, and 2*c* show a delay coking vessel 100 having a vessel outlet 110 which can be opened and closed, a coke chute 200 having a chute inlet 210, and a support platform 300. In FIG. 2*a*, the platform 300 is positioned to allow access to the closed vessel outlet 110. In FIG. 2*b*, the platform 300 is positioned to prevent the platform 300 interfering with coke passing through the open passage between vessel outlet 110 and chute inlet 210. Vessel outlet 110 is partially open, so it would be possible for coke to pass through the partially open outlet 110. Note that, because the outlet 110 is only partially open, coke passing through the vessel outlet 110 is not likely to fall straight down but instead to be at least partially diverted to the side. Spillage onto the support platform 300 while vessel outlet 110 is only partially open is prevented by moving the platform 300 away from the vessel outlet 110. Moreover, coke which would miss a coke chute inlet which matched the diameter of the vessel outlet 110, is caught by coke chute inlet 210 because coke chute 210 is sufficiently wide to catch coke discharged from the outlet 110 even if it is diverted to the side because the outlet 110 is only partially open.

Figure 3:
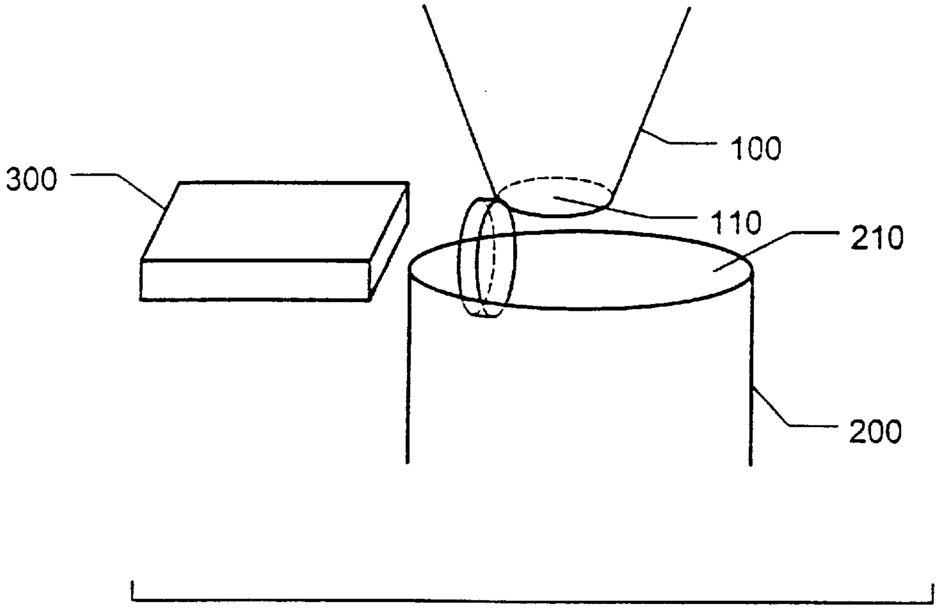
FIG. 3 is an schematic view of third system embodying the invention.

In FIG. 3, delay coking vessel 100 having a vessel outlet 110 which can be opened and closed, a coke chute 200 having a chute inlet 210, and a support platform 300. In FIG. 3, it can be seen that, for a large enough chute inlet 210 and deep enough coke chute 200, any cover or head opened on vessel outlet 110 can be allowed to swing into the chute inlet 210 and coke chute 200. As a result, less space need be provided between the vessel outlet 110 and chute inlet 210.

Figure 4:
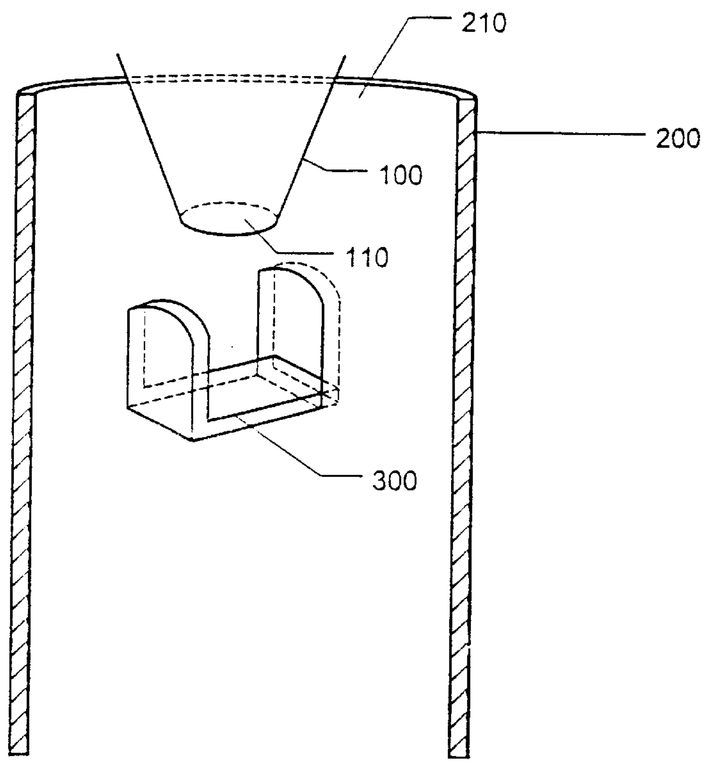
FIG. 4 is an schematic view of third system embodying the invention.

FIG. 4 shows how the support platform could actually be placed within the coke chute. In such an embodiment, there is no spillage, and, if the coke vessel can be automatically deheaded, there is much less risk to workers as they generally will not need to be near the vessel outlet 110 while there is still coke in coke vessel 100.

Figure 5A:
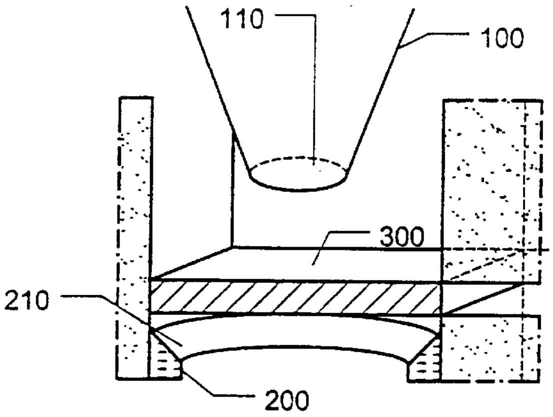
FIG. 5*a* is a schematic view of third system embodying the invention.
Figure 5B:
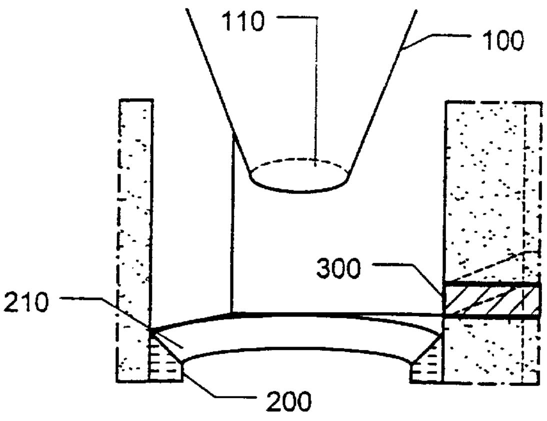
FIG. 5*b* is an alternate view of the system of FIG. 5*a.*

FIG. 5*a* shows how the bottom portion of a coking vessel 100 could extend into a room, and the coke chute inlet 210 could be as deep and wide as the floor of the room. When platform 300 is in a first position, it acts as the floor in the room. When it is in a second position, as in FIG. 5*b*, there is no floor left in the room to obstruct the flow of coke into the chute inlet.

Figure 6:
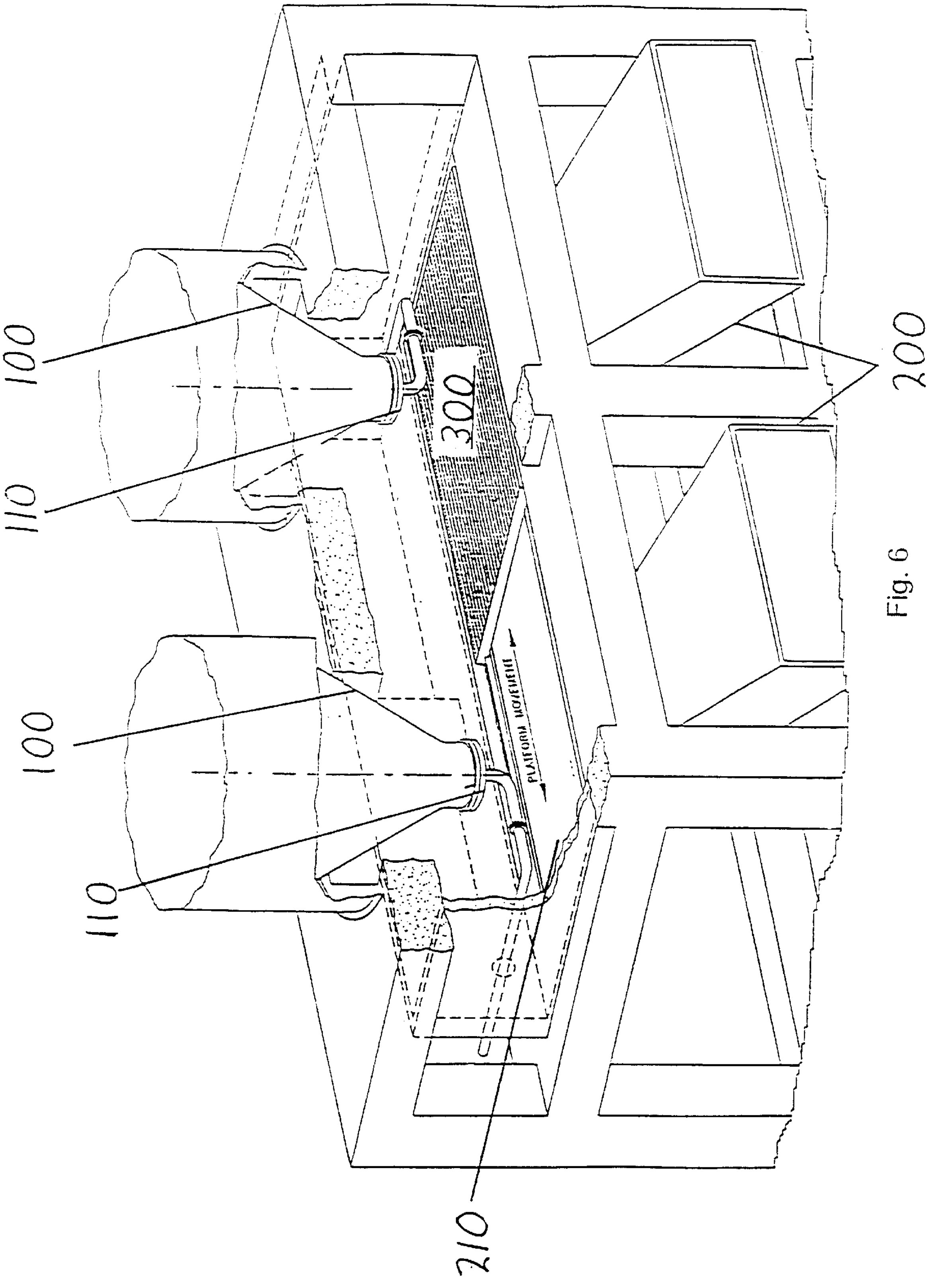
FIG. 6 is a schematic view of a preferred system embodying the invention.
Figure 7:
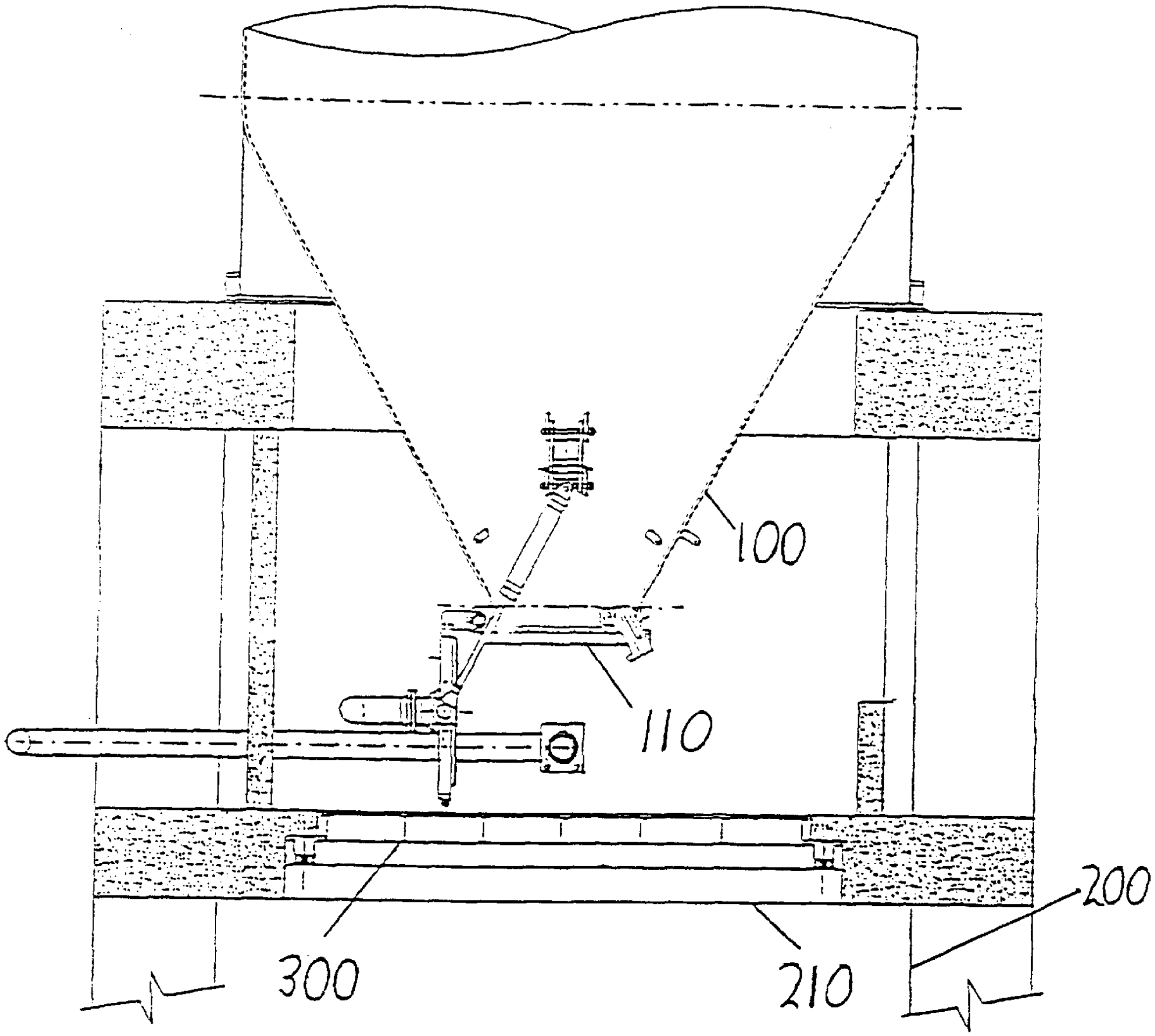
FIG. 7 is a schematic view of a second preferred system embodying the invention.

FIG. 6 shows two coking vessels positioned side by side in a supporting structure. The bottom portion of the vessels have bottom heads attached to them and are located above their respective coke chutes. The coke chute inlets of the coke chutes each have an area which is much wider than the coke vessel outlets and heads. The size of the outlets are sufficiently large that they would prohibit access to the bottom heads of the coking vessels if it were not for the shuttle platform shown. The shuttle platform essentially acts as a floor located above the coke chute inlets and below the coke vessel outlets. The platform is roughly as large as only one of the chute inlets, and is mounted on rails which allow the platform to be slid under either one of the coking vessels.

Such an embodiment provides a suitable work surface for deheading, maintaining, cleaning, or repairing one of the vessels, but also allows the surface to be moved out of the way at times when a vessel is being emptied.

A method embodying the claimed invention might comprise the following steps: (1) providing a coking vessel having a removable bottom head; (2) providing a coking chute detached from the coking vessel and positioned to create an open passage between the coking vessel and the coking chute; (3) providing a moveable support platform; (4) positioning the moveable support platform sufficiently near the bottom head to allow the bottom head to be removed from the coking vessel; (5) removing the bottom head to open an outlet in the coking vessel and to create an open passage between the outlet and the coking chute; (6) positioning the moveable support platform away from the bottom head; (7) draining the vessel without the need for additional drain piping attached to the vessel; (8) discharging coke from the coking vessel through the outlet opened by removal of the bottom head and allowing the coke to fall through the open passage between the coking vessel and the coking chute, and into the coking chute.

Thus, specific embodiments and applications of a coke drum system have been disclosed. It should be apparent, however, to those skilled in the art that many more modifications besides those already described are possible without departing from the inventive concepts herein. For example, the moveable support platform could be moveably mounted in many different ways including being placed on rails which allow it to slide back and forth, being provided with wheels and wheel supports which would allow it to be rolled from position to position or to be mounted to or provided with any mechanism which can support it and yet allow it to move. Similarly, it is possible to utilize any type of coking vessel, coke chute, or support structure or means to remove the bottom head. The inventive subject matter, therefore, is not to be restricted except in the spirit of the appended claims.

What is claimed is:

1. A coking system comprising a coking vessel for producing coke, the vessel comprising a vessel outlet and an outlet cover;

a coke chute having a chute inlet positioned to receive coke discharged from the vessel outlet, the chute inlet being substantially larger in width or diameter than the vessel outlet;

a moveable operator support platform adapted for positioning into at least a first position and a second position, the first position at least partially disposed in a flow path between the vessel outlet and the chute inlet while the chute inlet is positioned to receive coke discharged from the vessel outlet, and a second position providing an at least partially unhindered flowpath between the vessel outlet and the chute inlet while the chute inlet is positioned to receive coke discharged from the vessel outlet, and wherein the first position is different from the second position;

the platform sized and dimensioned to provide support to a vessel operator, the platform not including the outlet cover.

2. The coking system of claim 1 further comprising a floor positioned below the vessel outlet, and the platform moveably mounted to the floor.

3. The coking system of claim 1 wherein the vessel outlet can be opened and closed, and wherein the chute inlet is sized and dimensioned to receive all of the coke discharged through the vessel outlet while the vessel outlet is being opened.

4. The coking system of claim 3 wherein the chute inlet and the vessel outlet have inside diameters, and the chute inlet diameter is effectively large enough to channel the coke discharged from the vessel.

5. The coking system of claim 3 wherein the platform completely covers the chute inlet when positioned in the first position, and does not cover any portion of the chute inlet when positioned in the second position.

6. The coking system of claim 5 further comprising:

a second coking vessel for producing coke, the vessel comprising a vessel outlet wherein the vessel outlet can be opened and closed;

and a second coke chute having a chute inlet positioned to receive coke discharged from the second coking vessel, the second coke chute having a chute inlet sized and dimensioned to receive all coke discharged while the vessel outlet of the second coking vessel is being opened;

wherein the platform completely covers the second chute inlet when in the second position, and does not cover any portion of the second chute inlet when in the first position.

* * * * *